(12) United States Patent
Itazu et al.

(10) Patent No.: US 6,775,543 B2
(45) Date of Patent: Aug. 10, 2004

(54) CELLULAR PHONE, CELLULAR PHONE FAILURE JUDGMENT METHOD AND FAILURE JUDGMENT APPARATUS

(75) Inventors: Hiroyuki Itazu, Yokosuka (JP); Atsushi Murase, Yokosuka (JP); Shuji Tachibana, Urayasu (JP); Shogo Ito, Yokohama (JP)

(73) Assignee: NTT DoCoMo, Inc., Tokyo (JP)

( * ) Notice: Subject to any disclaimer, the term of this patent is extended or adjusted under 35 U.S.C. 154(b) by 399 days.

(21) Appl. No.: 09/842,165

(22) Filed: Apr. 26, 2001

(65) Prior Publication Data

US 2002/0002062 A1 Jan. 3, 2002

(30) Foreign Application Priority Data

Apr. 27, 2000 (JP) ......................................... 2000-128495

(51) Int. Cl.$^7$ ................................................. H04Q 7/20
(52) U.S. Cl. ......................... 455/423; 455/425; 455/557
(58) Field of Search ................................ 455/557, 425, 455/423

(56) References Cited

U.S. PATENT DOCUMENTS

| 6,088,588 A | * | 7/2000 | Osborne | ...................... 455/425 |
| 6,389,281 B1 | * | 5/2002 | Lee | .............................. 455/423 |
| 2002/0002062 A1 | * | 1/2002 | Itazu et al. | .................. 455/557 |

FOREIGN PATENT DOCUMENTS

| EP | 0 730 388 | | 9/1996 |
| EP | 1150526 | * | 10/2001 |
| JP | 8-237187 | | 9/1996 |
| JP | 11-122670 | | 4/1999 |
| WO | WO 98/43455 | | 10/1998 |

* cited by examiner

Primary Examiner—William Cumming
(74) Attorney, Agent, or Firm—Oblon, Spivak, McClelland, Maier & Neustadt, P.C.

(57) ABSTRACT

A method and apparatus for cellular phone failure judgment is provided, in which a cellular phone is connected to an external terminal and the external terminal reads normal communication history information, origination and receive failure history information and communication interruption history information which are stored in the cellular phone, and performs failure judgment for the cellular phone by the history information and judgment parameters.

31 Claims, 10 Drawing Sheets

FIG.2

| COMMUNICATION HISTORY INFORMATION | | STORED INFORMATION IN A RECORD | USAGE | FAILURE JUDGMENT ITEM | | |
|---|---|---|---|---|---|---|
| | | | | ①RECEIVE SYNCHRONIZATION JUDGMENT | ②RECEIVE SENSITIVITY JUDGMENT | ③SEND POWER JUDGMENT |
| NORMAL COMMUNICATION HISTORY (19 RECORDS AT THE MAXIMUM) | | STORING DATE AND TIME (MONTH, DAY, HOUR, MINUTE) | FOR IDENTIFYING STORING DATE AND TIME | | | |
| | | BASE STATION IDENTIFICATION CODE JUST BEFORE START OF COMMUNICATION | FOR IDENTIFYING BASE STATION | | | |
| | | DOWNLINK COMMON WIRELESS CHANNEL LEVEL JUST BEFORE START OF COMMUNICATION | FOR JUDGING ABNORMALITY OF RECEIVE SENSITIVITY | | ○ | |
| | | DOWNLINK INDIVIDUAL WIRELESS CHANNEL LEVEL JUST AFTER START OF COMMUNICATION | | | | |
| | | DOWNLINK INDIVIDUAL WIRELESS CHANNEL QUALITY JUST AFTER START OF COMMUNICATION | | | | |
| | | INITIAL SEND POWER AT THE TIME OF COMMUNICATION START | FOR JUDGING ABNORMALITY OF SEND POWER AND RECEIVE SENSITIVITY | | ○ | ○ |
| | | SEND POWER JUST AFTER START OF COMMUNICATION | | | ○ | ○ |
| ORIGINATION AND RECEIVE FAILURE HISTORY (15 RECORDS AT THE MAXIMUM) | | STORING DATE AND TIME (MONTH, DAY, HOUR, MINUTE) | FOR IDENTIFYING STORING DATE AND TIME | | | |
| | | BASE STATION IDENTIFICATION CODE AT THE TIME OF FAILURE | FOR IDENTIFYING BASE STATION | | | ○ |
| | | DOWNLINK COMMON WIRELESS CHANNEL LEVEL AT THE TIME OF FAILURE | FOR JUDGING LEVEL AT THE TIME OF FAILURE | | | ○ |
| | | INITIAL SEND POWER AT THE TIME OF FAILURE | FOR JUDGING ABNORMALITY OF SEND POWER | | | ○ |
| | | FAILURE REASON | FOR IDENTIFYING FAILURE REASON | | | |
| COMMUNICATION INTERRUPTION HISTORY (30 RECORDS AT THE MAXIMUM) | | STORING DATE AND TIME (MONTH, DAY, HOUR, MINUTE) | FOR IDENTIFYING STORING DATE AND TIME | | | |
| | | BASE STATION IDENTIFICATION CODE AT THE TIME OF FAILURE | FOR IDENTIFYING BASE STATION | | ○ | ○ |
| | | SEND POWER JUST AFTER START OF COMMUNICATION | FOR JUDGING ABNORMALITY OF SEND POWER | | ○ | |
| | | SEND POWER AT THE TIME OF COMMUNICATION INTERRUPTION | FOR JUDGING ABNORMALITY OF SEND POWER | | ○ | |
| | | DOWNLINK INDIVIDUAL WIRELESS CHANNEL LEVEL AT THE TIME OF COMMUNICATION INTERRUPTION | FOR JUDGING LEVEL AT THE TIME OF FAILURE | ○ | | |
| | | DOWNLINK INDIVIDUAL WIRELESS CHANNEL QUALITY AT THE TIME OF COMMUNICATION INTERRUPTION | FOR JUDGING QUALITY AT THE TIME OF FAILURE | ○ | | |
| | | FAILURE REASON | FOR IDENTIFYING FAILURE REASON | ○ | | |

CELLULAR PHONE, CELLULAR PHONE FAILURE JUDGMENT METHOD AND FAILURE JUDGMENT APPARATUS

BACKGROUND OF THE INVENTION

1. Field of the Invention

The present invention relates to a cellular phone and a cellular phone failure judgment method.

2. Description of the Related Art

Conventionally, there are several failure judgement methods of judging whether a cellular phone fails or not. For example, the failure judgment is performed by asking the failure reporter about the failure situation and replicating the corresponding failure. Or, measurement of various kinds of static characteristics of wireless parts of the cellular phone is performed by using a measurement apparatus, and, then, the failure judgment is performed, wherein the measurement apparatus includes a measurement part for the wireless parts of the cellular phone and a cellular phone controller for controlling the wireless parts of the cellular phone for performing the measurement separately or in a body.

However, according to the conventional methods, since there is no communication history information of the cellular phone which indicates situations in which the reporter judged that the cellular phone failed, there is a problem in that it is difficult to replicate the failure situation. In addition, there is a problem in that, even when the failure situation can be replicated, it takes much time.

SUMMARY OF THE INVENTION

It is an object of the present invention to perform failure judgment immediately by performing failure judgment based on the communication history information which indicates situations in which the reporter judged that the cellular phone failed without the wireless part measurement apparatus.

The above object of the present invention is achieved by a cellular phone including:

a memory part which stores, as communication history information, notification information sent from a base station and information indicating radio status when communication is performed normally, a reason why communication is not performed normally when communication is not performed normally, and notification information sent from a base station and information indicating radio status when communication is not performed normally; and an interface part which outputs the communication history information to an external terminal connected to the interface part.

In the cellular phone, the memory part may further stores communication date and time, and operation status of the cellular phone as the communication history information.

In the cellular phone, the reason why communication is not performed normally may be determined by the cellular phone;

the notification information sent from the base station may include a base station identification code; and the information indicating radio status may include a receive level of downlink wireless channel of the cellular phone in a standby status, a send power value in which send power control is performed when communication is not performed normally, a receive level of downlink wireless channel when communication is not performed normally, quality of downlink wireless channel when communication is not performed normally.

In the above-mentioned cellular phone, wherein the communication date and time includes date and time of storing the communication history information;

the operation status includes information indicating one of operations of position registration, call origination, call receiving or communication state which the cellular phone did not perform normally.

According to the above invention, the external terminal can perform failure judgment by using the stored communication history information.

The above object of the present invention is also achieved by a cellular phone including:

a memory part which stores normal communication history information when communication is performed normally, origination and receive failure history information when origination and receive are not performed normally, and communication interruption history information when communication is interrupted;

an interface part which outputs each history information stored in the memory part to an external terminal connected to the interface part.

In the cellular phone, each of the history information may include a base station identification code; and each of the origination and receive failure history information and the communication interruption history information may include communication failure reasons.

In the cellular phone, resynchronization waiting time out in an event of loss of synchronism may be one of the failure reason in the communication interruption history information.

In the cellular phone as claimed in claim 6, wherein response waiting time out for call origination request signal may be one of the failure reason in the origination and receive failure history information.

According to the above invention, the external terminal can perform failure judgment by using the stored communication history information.

The above object of the present invention is also achieved by a method of cellular phone failure judgment including the steps of:

connecting a cellular phone to an external terminal, the cellular phone including a memory part which stores, as communication history information, notification information sent from a base station and information indicating radio status when communication is performed normally, a reason why communication is not performed normally when communication is not performed normally, and notification information sent from a base station and information indicating radio status when communication is not performed normally; and an interface part which outputs the communication history information to the external terminal;

the external terminal reading the communication history information stored in the memory part of the cellular phone, and performing failure judgment for the cellular phone.

The method may further includes the steps of:

the external terminal performing failure judgment for receive synchronization and receive sensitivity in a receive system and for send power in a send system.

The method may further include the steps of:

the external terminal comparing judgment parameters stored in the external terminal and the communication history information stored in the memory part of the cellular phone, and performing failure judgment.

The method may further includes the steps of:

judging whether situations in which communication was not performed normally occurred in a plurality of base stations or in only one base station;

judging that the cellular phone is faulty only when it is judged that the situations occurred in a plurality of base stations.

Accordingly, it can be prevented that the cellular phone is judged to be faulty although the base station is faulty.

The above object of the present invention is also achieved by a method of cellular phone failure judgment including the steps of:

a cellular phone storing normal communication history information when communication is performed normally, origination and receive failure history information when origination and receive are not performed normally, and communication interruption history information when communication is interrupted;

a failure judgment apparatus reading the normal communication history information, the origination and receive failure history information and the communication interruption history information;

the failure judgment apparatus performing failure judgment for receive synchronization and receive sensitivity in a receive system and for send power in a send system.

The method may further include the step of:

the failure judgment apparatus determining which failure judgment is performed among the receive synchronization, receive sensitivity and send power according to the number of records of each of the history information.

The method may further include the step of:

the failure judgment apparatus comparing judgment parameters stored in the failure judgment apparatus and predetermined information in the history information, and performing failure judgment.

The method may further include the step of:

judging whether situations in which communication was not performed normally occurred in a plurality of base stations or in only one base station;

judging that the cellular phone is faulty only when it is judged that the situations occurred in a plurality of base stations.

In the method, the communication interruption history information may include reasons for communication interruption, and the method may further include the step of:

judging that the cellular phone has a failure of receive synchronization
when a mean value of receive levels of downlink wireless channels in communication interruption history records having synchronization failure as the reason is equal to or more than a predetermined judgment parameter value and when a mean value of qualities of downlink wireless channels in the communication interruption history records is equal to or more than a predetermined judgment parameter value.

According to the above invention, the possibility of failure can be judged since the synchronization failure occurs even when the receive level is high. In addition, it can be judged that the cellular phone has receive synchronization failure since synchronization failure occurs even when receive quality is good.

The method may further comprising the steps of judging that the cellular phone has a failure on receive sensitivity when, in the communication interruption history information, a mean value of send power values at the time of communication interruption is equal to or less than a predetermined judgment parameter value when a mean value of receive levels of downlink wireless channels at the time of communication interruption is equal to or less than a predetermined judgment parameter value and when, in the normal communication history information, a mean value of receive levels of downlink wireless channels in a standby status is equal to or less than a predetermined judgment parameter value.

According to the above invention, when receive level is low even when send power is lower than a judgment value which means that the cellular phone is near the base station, it can be judged that there is a possibility of failure. In addition, it can be judged that the cellular phone has receive sensitivity failure when receive level is low in normal state.

In the method, the origination and receive failure history information may include reasons for origination and receive failure; the method may further including the steps of:

judging that the cellular phone has a failure on send power
when the number of records in the origination and receive failure history information is equal to or more than a predetermined judgment parameter value in each of which records receive level of downlink wireless channel in a standby status is equal to or more than a predetermined judgment parameter value and the reason is response waiting time out for call origination request signal, and when a mean value of send power values in base stations, in which origination and receive failure occurred, is equal to or more than a predetermined judgment parameter value at the time of normal communication.

According to the above invention, it can be judged that there is a possibility of failure when response waiting time out occurs even when receive level is higher than a predetermined value. In addition, it can be judged that the send power system is faulty when send power is higher than a predetermined value in normal state, since it means that the send power is not properly controlled.

BRIEF DESCRIPTION OF THE DRAWINGS

Other objects, features and advantages of the present invention will become more apparent from the following detailed description when read in conjunction with the accompanying drawings, in which:

FIG. 2 shows communication history information stored in the cellular phone and the usage of the communication history information;

DETAILED DESCRIPTION OF THE PREFERRED EMBODIMENTS

In the following, embodiments of the present invention will be described with reference to figures.

Figure 1:
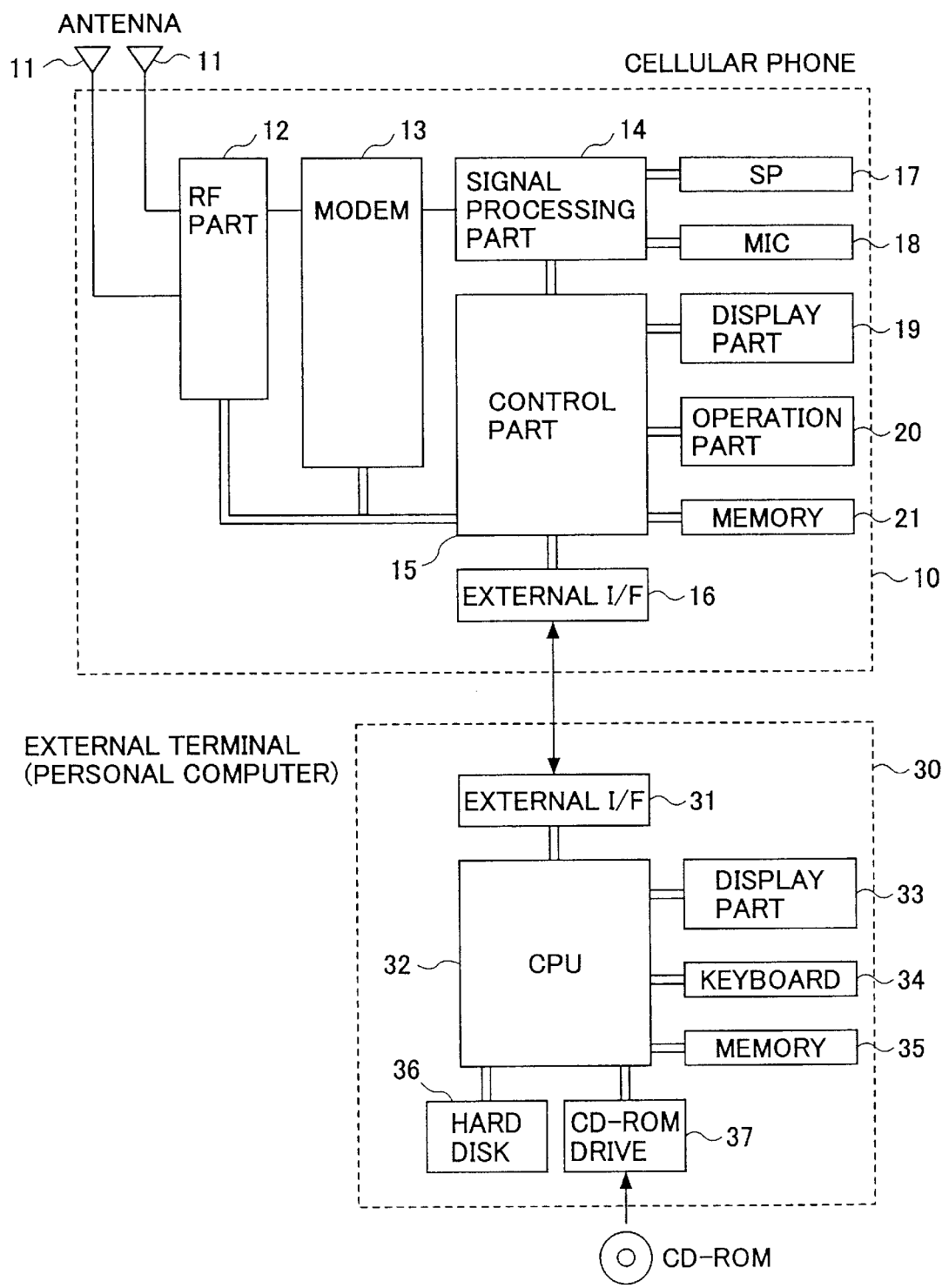
FIG. 1 shows a configuration of a cellular phone and an external terminal according to the present invention.

FIG. 1 shows a configuration of a cellular phone and an external terminal according to the present invention.

As shown in FIG. 1, the configuration includes a cellular phone 10 and an external terminal (for example, a personal computer) 30 which is connected to the cellular phone 10.

The cellular phone 10 includes an antenna 11, a radio-frequency transceiver (an RF part) 12, a modem 13, a signal processing part 14, a control part 15, an external interface part (external I/F) 16, a speaker (SP) 17, a microphone (MIC) 18, a display part 19, an operation part 20 and a memory 21.

The external terminal 30 includes an external interface (external I/F) 31, a CPU (Central Processing Unit) 32, a display part 33, a keyboard 34, a memory 35, a, hard disk 36 and a CD-ROM drive 37.

The memory 21 provided in the cellular phone 10 stores communication history information.

The communication history information includes notification information and information indicating a state of radio wave sent from base stations when communication was performed normally, and includes, when communication was not performed normally, reasons why the communication was not performed normally and notification information and information indicating a state of radio wave sent from base stations. In addition, the communication history information includes communication date and time and operating conditions of the cellular phone.

The operating conditions of the cellular phone include information indicating an operation of the cellular phone at which the communication failed in which the operation is one of position registration, call origination, call receiving and conducting communications.

The external interface 16 of the cellular phone 10 is used for reading the communication history information stored in the memory 21 from the external terminal.

The external terminal 30 obtains the communication history information via the external interface part 31 of the external terminal and the external interface part 16 of the cellular phone 10. The memory 35 of the external terminal 30 stores judgment parameters used for comparing with the communication history information when failure judgment is performed.

The external terminal 30 performs failure judgment by comparing the judgment parameters stored in the external terminal 30 with the communication history information stored in the memory of the cellular phone 10.

FIG. 2 shows the communication history information stored in the cellular phone 10 and the usage. The communication history information will be described in more detail with reference to FIG. 2.

Figure 3:
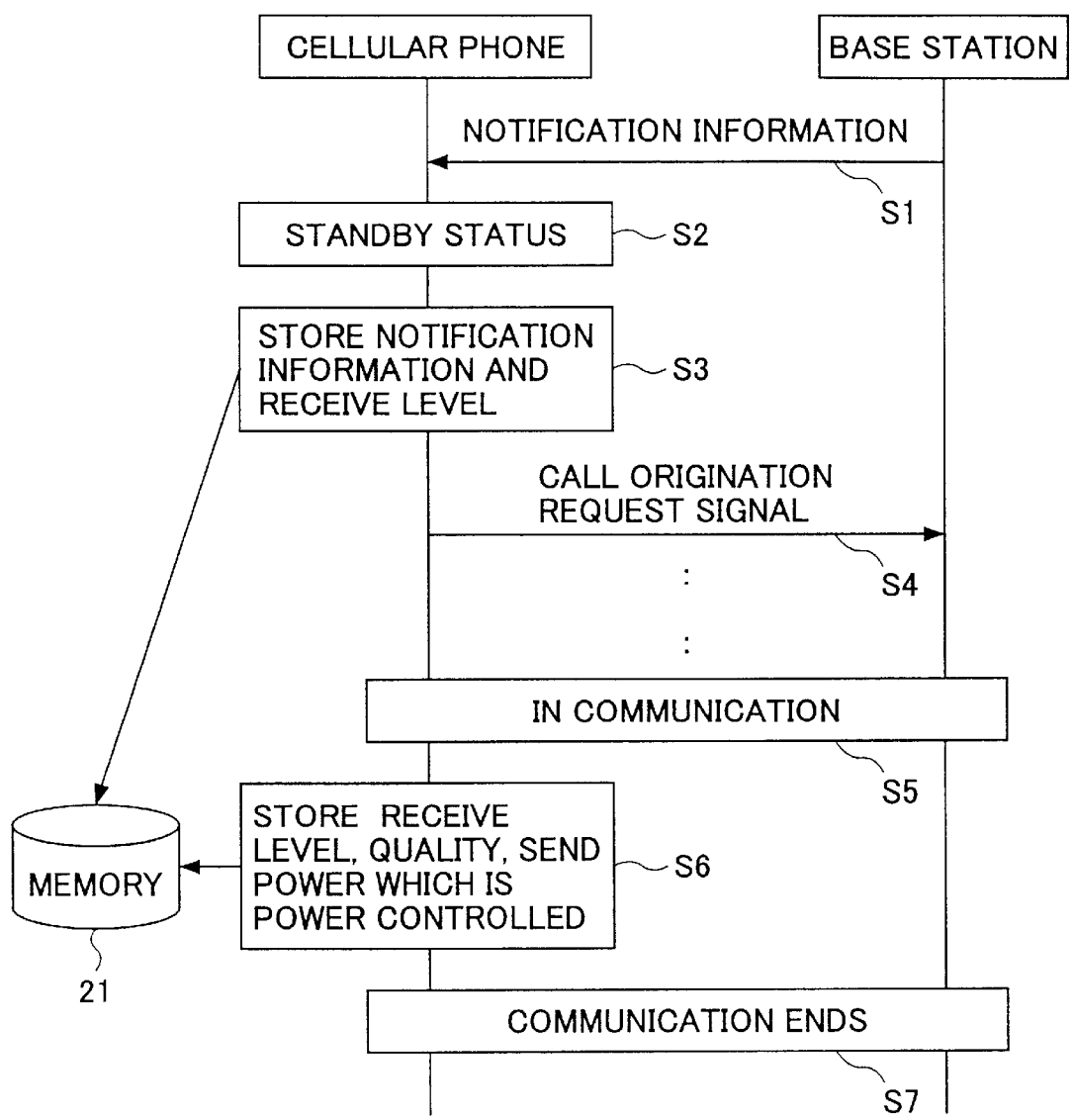
FIG. 3 is a flowchart for a case in which normal communication history information is stored when communication by call origination is performed normally.
Figure 4:
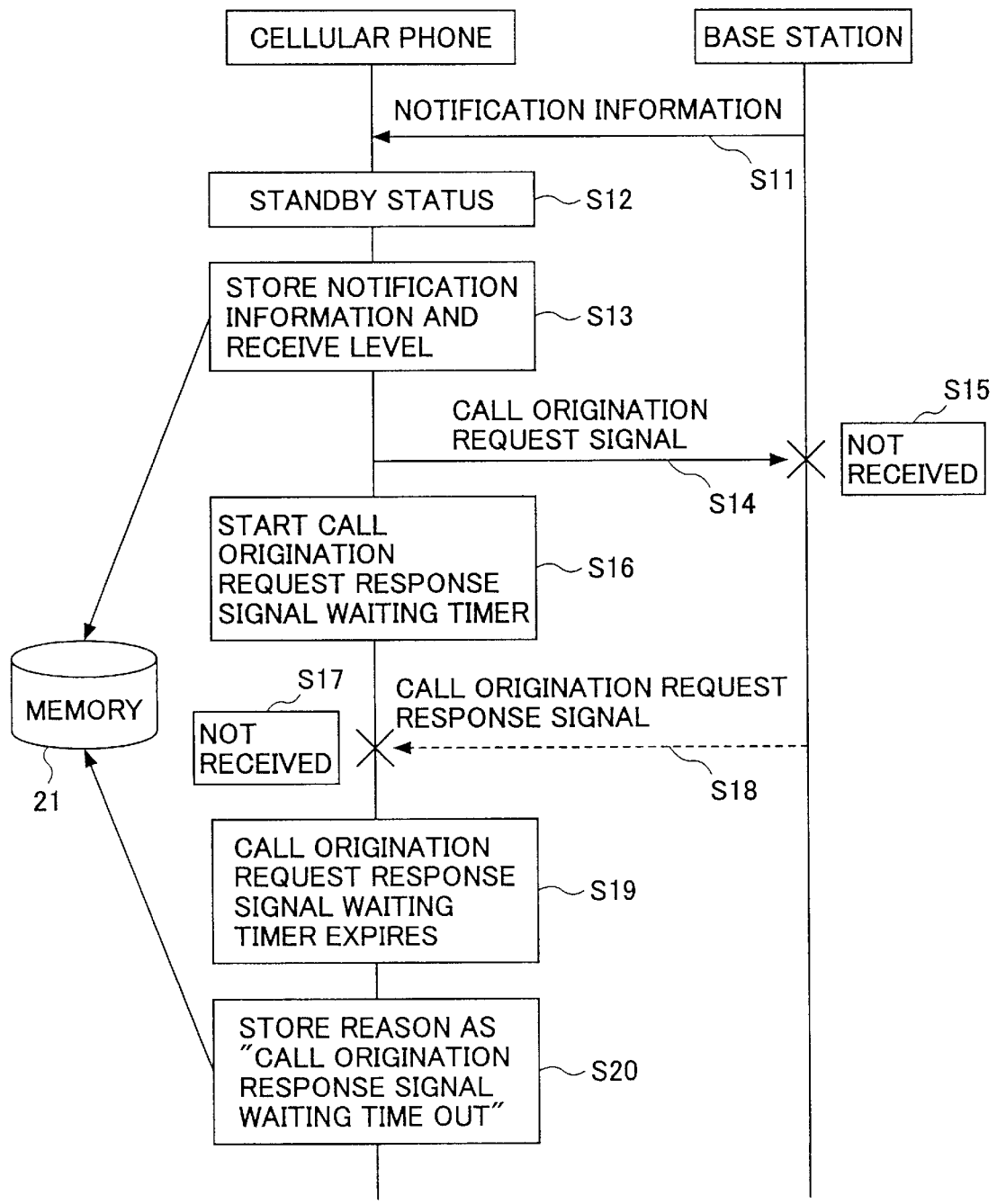
FIG. 4 is a flowchart for a case in which the cellular phone stores origination and receive failure history information when communication is not performed normally due to failure at the time of call origination.
Figure 5:
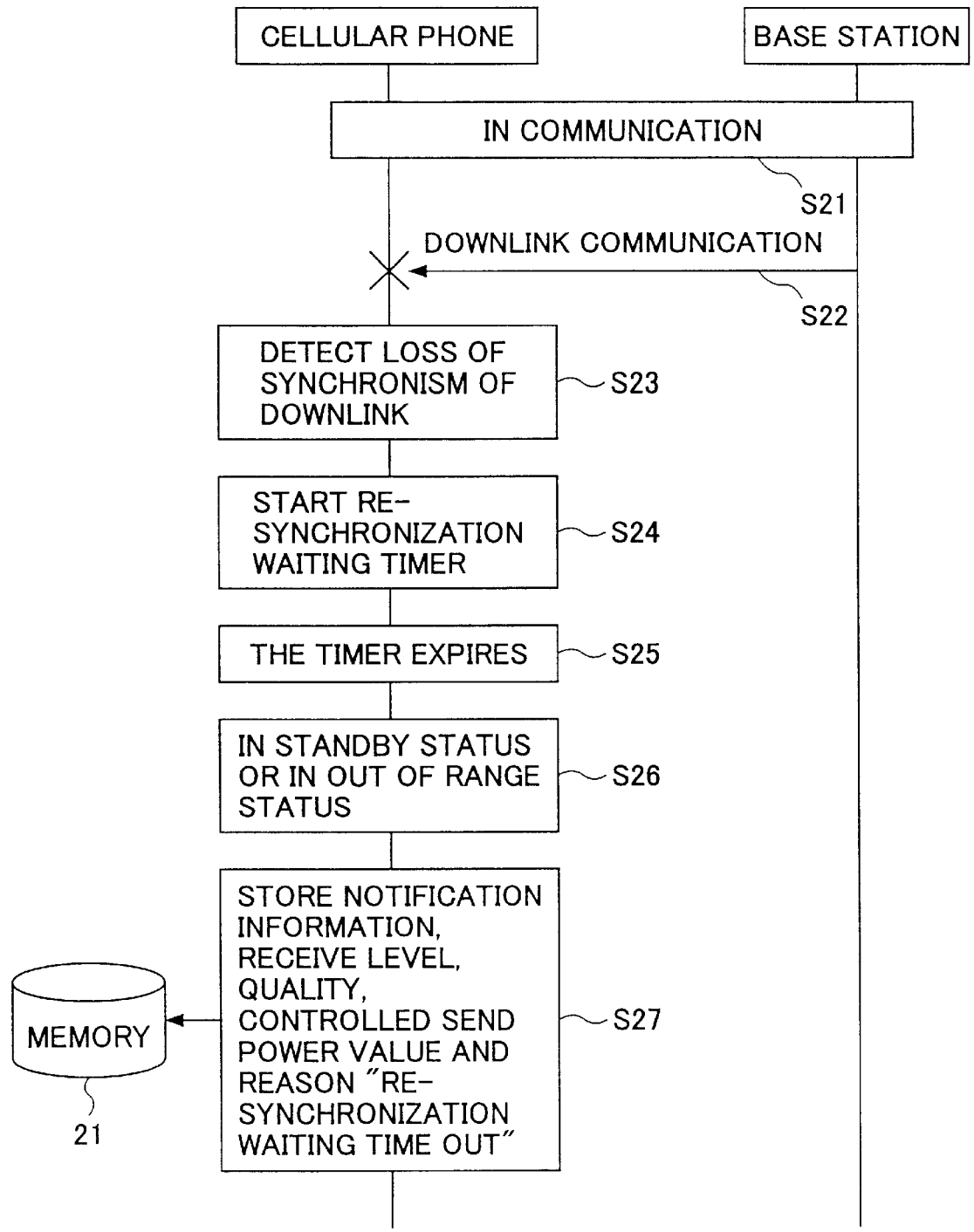
FIG. 5 is a flowchart for a case in which the cellular phone stores communication interruption history information when communication is not performed normally because communication interruption occurs due to loss of synchronism during communication.

As shown in FIG. 2, the cellular phone 10 stores normal communication history information, failure history information of call origination and receiving and the like (which will be called "origination and receive failure history information" hereinafter), and communication interruption history information as the communication history information. These history information is organized and stored in the memory 21 according to after-mentioned situations (FIGS. 3–5). For example, these history information is organized and stored such that the normal communication history information is stored in an area A in the memory 21, the origination and receive failure history information is stored in an area B in the memory 21 and the communication interruption history information is stored in an area C in the memory 21.

19 history records are stored at the maximum as the normal communication history information, 15 history records are stored at the maximum as the origination and receive failure history information, and 30 history records are stored at the maximum as the communication interruption history information. "STORED INFORMATION IN A RECORD" in FIG. 2 shows stored items per one history record of each history information. Each history record of the normal communication history information is not stored every time when the history event occurs, but is stored at predetermined intervals.

The failure reason in the origination and receive failure history information and the communication interruption history information is determined by values of a predetermined counter or timer.

In this embodiment of the present invention, receive synchronization failure judgement, receive sensitivity failure judgment and send power failure judgment are performed in which the receive synchronization failure judgement and the receive sensitivity failure judgment are performed for judging failure of a receive system and the send power judgment is performed for judging failure of a send system of the cellular phone.

In the receive synchronization failure judgement, failure of the receive system due to receive synchronization failure is judged from occurrence state of loss of synchronism, in the receive sensitivity failure judgment, failure of the receive system is judged from occurrence of becoming out of range and receive level during standby/communication. In the send power judgment, failure of send power system is judged from situation of power control. "failure judgment item" in FIG. 2 shows each failure judgment and corresponding stored item in each history information which is used for the failure judgment. The method in which failure judgment is performed by using the items will be described with reference to FIGS. 7–9 later.

FIG. 3 is a flowchart showing an example in which the communication history information (normal communication history information) is stored when communication by call origination is performed normally.

When the cellular phone 10 receives notification information from the base station in step 1, the cellular phone 10 becomes in a standby status in step 2. At this time, the cellular phone 10 stores the notification information and receive level of the notification information in step 3. Accordingly, the cellular phone 10 stores the receive level at the time of call origination in the memory 21. That is, the cellular phone 10 stores a base station identification code and a downlink common wireless channel level just before starting communication shown in FIG. 2.

Next, the cellular phone 10 sends a call origination request signal in step 4. After that, after sending a response to the call origination request signal and the like, the cellular phone and the base station becomes in communication state in step 5.

During normal communication, the cellular phone 10 stores receive level and quality in the communication, send power value after the send power is controlled in step 6. More particularly, the cellular phone 10 stores downlink individual wireless channel level just after start of communication, downlink individual wireless channel quality just after start of communication, initial send power value at the time of start of communication and send power value just after the start of communication. After that, the communication ends in step 7.

FIG. 4 shows a flowchart of an operation example in which the cellular phone stores the communication history information (origination and receive failure history information) when communication is not performed normally due to failure at the time of call origination.

When the cellular phone 10 receives notification information from the base station in step 11, the cellular phone 10 becomes in a standby status in step 12. At this time, the cellular phone 10 stores the notification information and receive level of the notification information in step 13. That is, the cellular phone 10 stores a base station identification code and a downlink common wireless channel level.

Next, the cellular phone 10 sends a call origination request signal in step 14. In this case, assuming that the base station can not receive the call origination request signal in step 15, the cellular phone 10 starts a call origination request response signal waiting timer after sending the call origination request signal in step 16.

After that, since there is no call origination request response in step 18, the cellular phone does not receive the call origination request response in step 17. Then, the call origination request response signal waiting timer expires in step 19.

When the cellular phone 10 judges that the call origination fails, the cellular phone 10 stores the failure reason as "call origination response signal waiting time out" in the memory 21 in step 20. In addition, the cellular phone 10 stores initial send power value.

FIG. 5 shows a flowchart of an operation example in which the cellular phone stores the communication history information (communication interruption history information) when communication is not performed normally because communication interruption occurs due to loss of synchronism during communication.

In step 21, the cellular phone 10 and the base station are in communication state. The base station sends a communication signal by using a downlink wireless channel in step 22.

The cellular phone 10 detects loss of synchronism of the downlink wireless channel in step 23 so that the cellular phone 10 does not receive communication signal of the downlink wireless channel.

When the cellular phone 10 detects the loss of synchronism of the downlink wireless channel, the cellular phone 10 starts re-synchronization waiting timer in step 24. When the timer expires in step 25, the cellular phone 10 becomes in a standby status or in an out of range status in step 26.

The cellular phone 10 stores notification information, receive level and quality at the time of communication interruption, controlled send power value and a reason for communication interruption in the memory 21 in step 27. In this case, "re-synchronization waiting time out" which is information of synchronization failure is stored as the failure reason. That is, as shown in FIG. 2, base station identification code at the time of failure, send power value just after start of communication, send power value, downlink individual wireless channel level, downlink individual wireless channel quality at the time of communication interruption and the like are stored.

Figure 6:
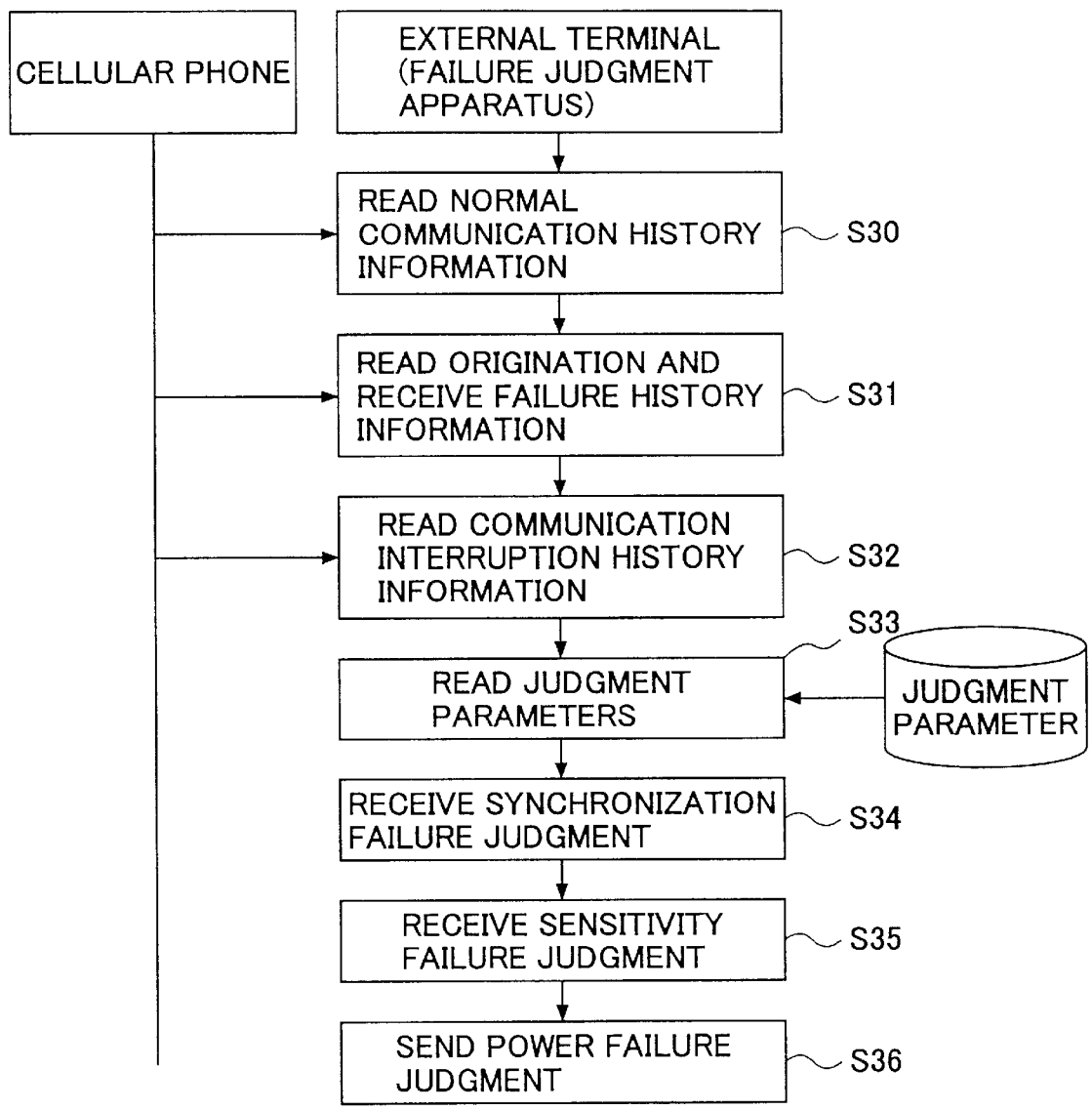
FIG. 6 is a flowchart showing whole processes when the external terminal performs the failure judgment.

FIG. 6 shows a flowchart showing whole processes when the external terminal performs the failure judgments.

First, the external terminal 10 reads the normal communication history information, the origination and receive failure history information and the communication interruption history information successively from the cellular phone 10 in steps 30–32. Then, the external terminal 10 reads judgment parameters stored in the external terminal in step 33, wherein the judgment parameters are judgment values used as reference values in the judgment.

After that, receive synchronization failure judgement in step 34, receive sensitivity failure judgment in step 35 and send power failure judgment in step 36 are performed.

In the following each of the failure judgments will be described with reference to FIGS. 7–9.

Figure 7:
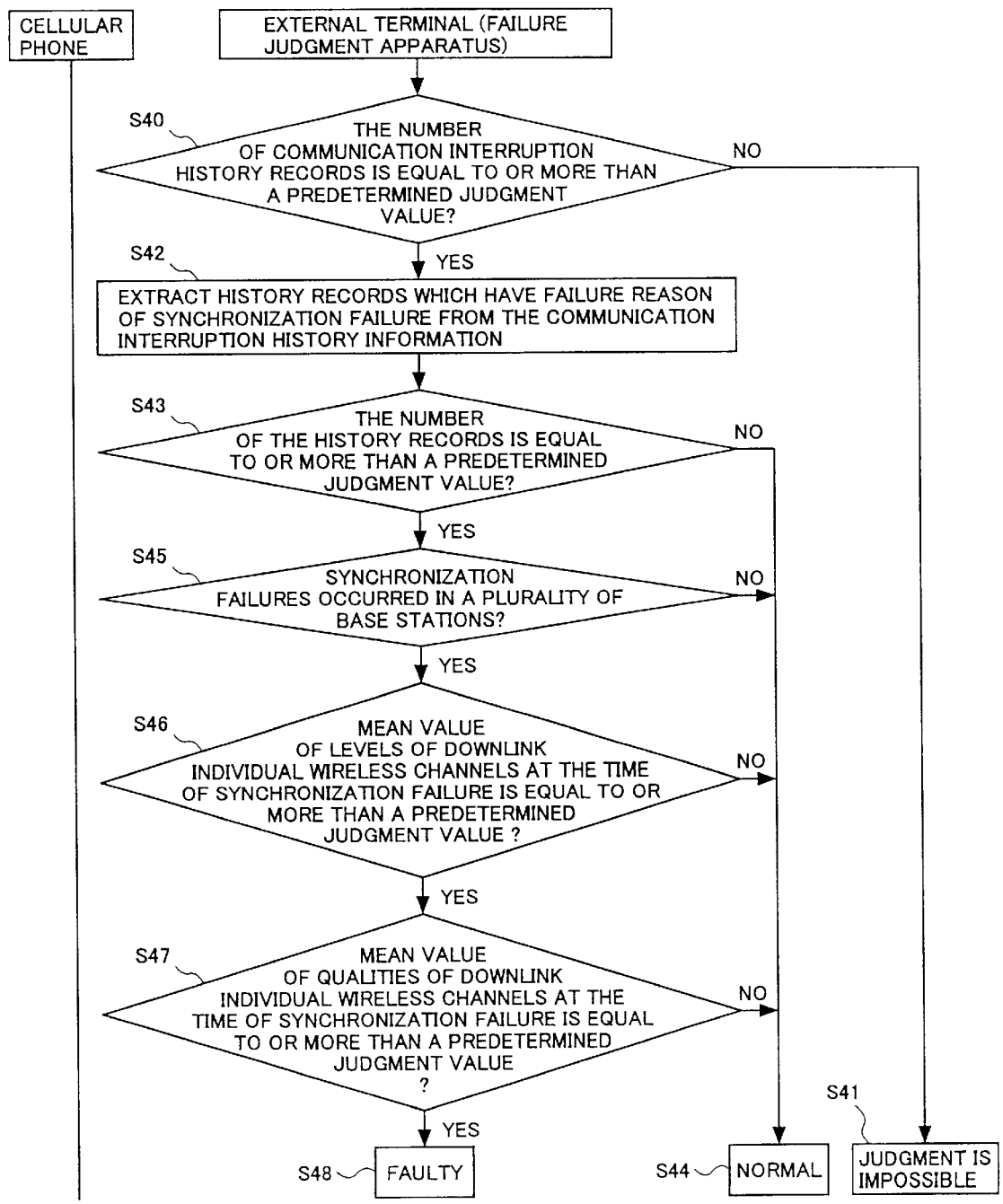
FIG. 7 is a flowchart showing a receive synchronization failure judgement example in the external terminal.

FIG. 7 is a flowchart showing a receive synchronization failure judgement example in the external terminal.

First, the external terminal checks whether the number of communication interruption history records is equal to or more than a predetermined judgment value in step 40. When the number is smaller than the predetermined judgment value (N in step 40), the receive synchronization failure judgment ends in step 41 since the judgment is impossible.

When the number is equal to or more than the predetermined judgment value (Y in step 40), the external terminal extracts history records which have failure reason of synchronization failure from the communication interruption history information in step 42. Next, the external terminal checks whether the number of the history records is equal to or more than a predetermined judgment value in step 43. When the number is smaller than the predetermined judgment value (N in step 43), the external terminal judges that receive synchronization is normal in step 44.

When the number is equal to or more than the predetermined judgment value (Y in step 43), it is judged whether synchronization failures occurred in a plurality of base stations based on notification information (base station identification code) of the extracted history records in step 45. When all of the synchronization failures occurred between the cellular phone and one base station (N in step 45), it is judged that the cellular phone 10 is normal in step 44 since it can not be judged whether the cause of the failure is in the cellular phone 10 or in the base station.

When the synchronization failures occurred in a plurality of base stations (Y in step 45), it is judged whether a mean value of levels of downlink individual wireless channels at the time of synchronization failure is equal to or more than a predetermined judgment value in step 46. When the number is smaller than the predetermined judgment value (N in step 46), it is judged that the cellular phone 10 is normal in step 44 since it can not be judged whether the cause of the failure is in the cellular phone 10 or in the base station.

When the number is equal to or more than the predetermined judgment value (Y in step 46), it is judged whether a mean value of qualities of downlink individual wireless channels at the time of synchronization failure is equal to or more than a predetermined judgment value in step 47. When the number is smaller than the predetermined judgment value (N in step 47), it is judged that the cellular phone 10 is normal in step 44 since it can not be judged whether the cause of the failure is in the cellular phone 10 or in the base station.

When the number is equal to or more than the predetermined judgment value (Y in step 47), it is judged that the cause of the synchronization failure is failure of the cellular phone 10 in step 48.

In the above-mentioned processes, it is judged, in step 46, that there is a possibility that the cellular phone 10 is faulty since the synchronization failure occurred in spite of the fact that receive level was high. In addition, it is judged that the cellular phone 10 is faulty since the synchronization failure occurred in spite of the fact that the receive quality was good in step 47.

Figure 8:
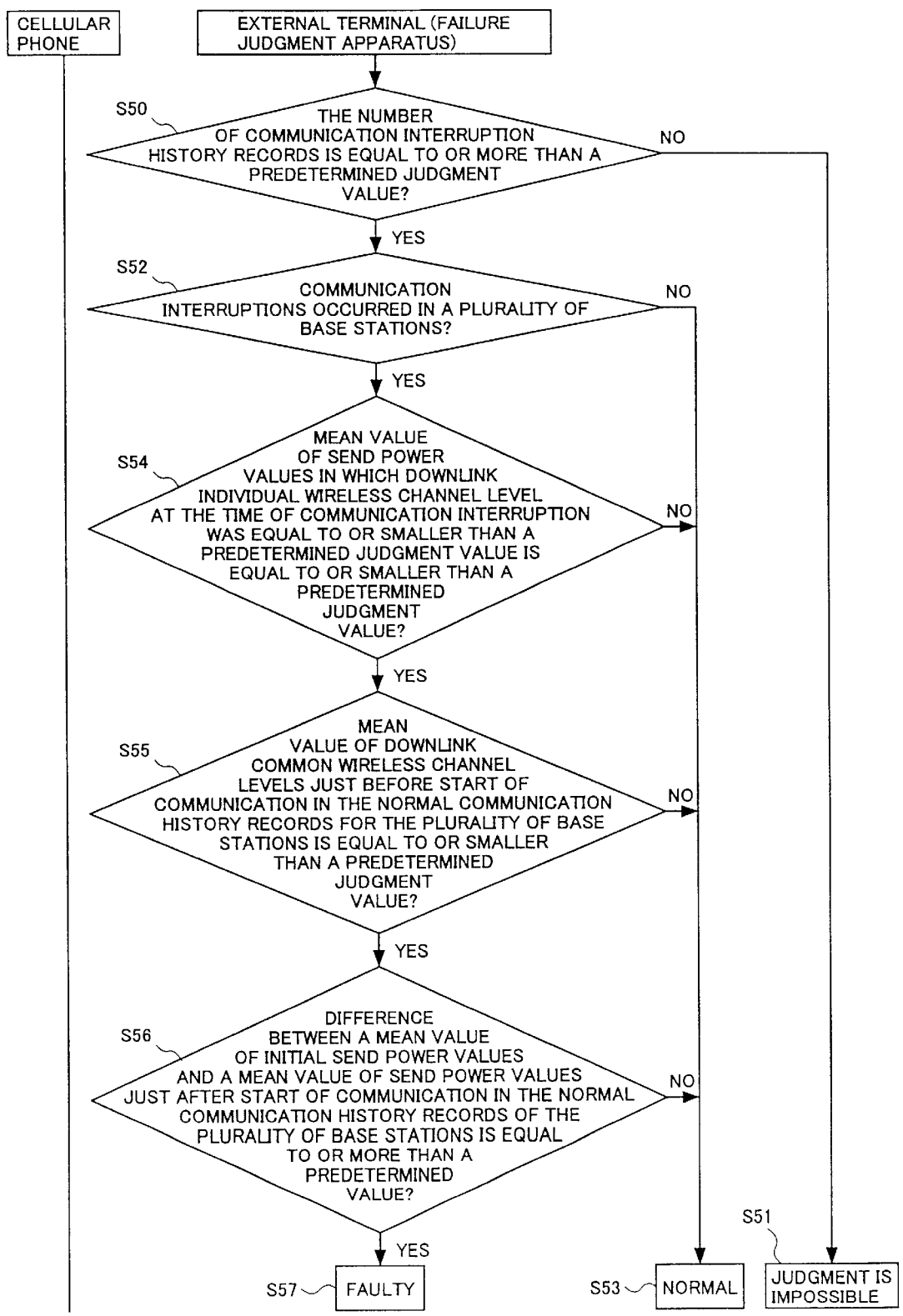
FIG. 8 is a flowchart showing a receive sensitivity failure judgment example in the external terminal.

FIG. 8 is a flowchart showing a receive sensitivity failure judgment example in the external terminal.

First, the external terminal checks whether the number of communication interruption history records is equal to or more than a predetermined judgment value in step 50. When the number is smaller than the predetermined judgment value (N in step 50), the receive sensitivity failure judgment ends in step 51 since the judgment is impossible. When the number is equal to or more than the predetermined judgment value (Y in step 50), it is judged whether communication interruptions occurred in a plurality of base stations based on notification information (base station identification code) of the extracted history records in step 52. When all of the interruptions occurred between the cellular phone and one base station (N in step 52), it is judged that the cellular phone 10 is normal in step 53 since it can not be judged whether the cause of the failure is in the cellular phone 10 or in the base station.

When the interruptions occurred in a plurality of base stations (Y in step 52), it is judged whether a mean value of send power values in which downlink individual wireless channel level at the time of communication interruption was equal to or smaller than a predetermined judgment value is equal to or smaller than a predetermined judgment value in step 54. When the mean value of the send power values is more than the predetermined judgment value (N in step 54), it is judged that the cellular phone 10 is normal in step 53.

When the mean value of the send power values is equal to or smaller than the predetermined judgment value (Y in step 54), it is judged whether a mean value of downlink common wireless channel levels just before start of communication (receive level in a standby status) in the normal communication history records for the plurality of base stations is equal to or smaller than a predetermined judgment value in step 55. When the mean value of the receive levels is not equal to or smaller than the predetermined value (N in step 55), it is judged that the cellular phone 10 is normal in step 53 since it can not be judged that the cause of the communication interruption is in the cellular phone 10.

When the mean value of the receive levels is equal to or smaller than the predetermined value (Y in step 55), it is judged whether difference between a means value of initial send power values and a mean value of send power values just after start of communication in the normal communication history records of the plurality of base stations is equal to or more than a predetermined value in step 56. When the difference between the mean values is smaller than the predetermined value (N in step 56), it is judged that the cellular phone 10 is normal in step 53 since it can not be judged that the cause of the communication interruption is in the cellular phone 10.

When the difference between the mean values is equal to or more than the predetermined value (N in step 56), it is judged that the cellular phone 10 is faulty due to receive sensitivity failure in step 57.

In the above-mentioned processes, it is judged, in step 54, that there is a possibility that the cellular phone 10 is faulty since the receive level is low in spite of the fact that the cellular phone was near the base station because the mean value of the send power values was equal to or smaller than the judgment value.

In step 55, it is judged that there is a possibility that the cellular phone 10 is faulty since the receive level of the common wireless channels in normal state is low.

If receive sensitivity is normal, the difference in step 56 should become smaller than the judgment value since send power is properly lowered by power control. However, when the difference is equal to or more than the judgment value, it is judged that signal was not received normally due to receive sensitivity failure in step 56.

Figure 9:
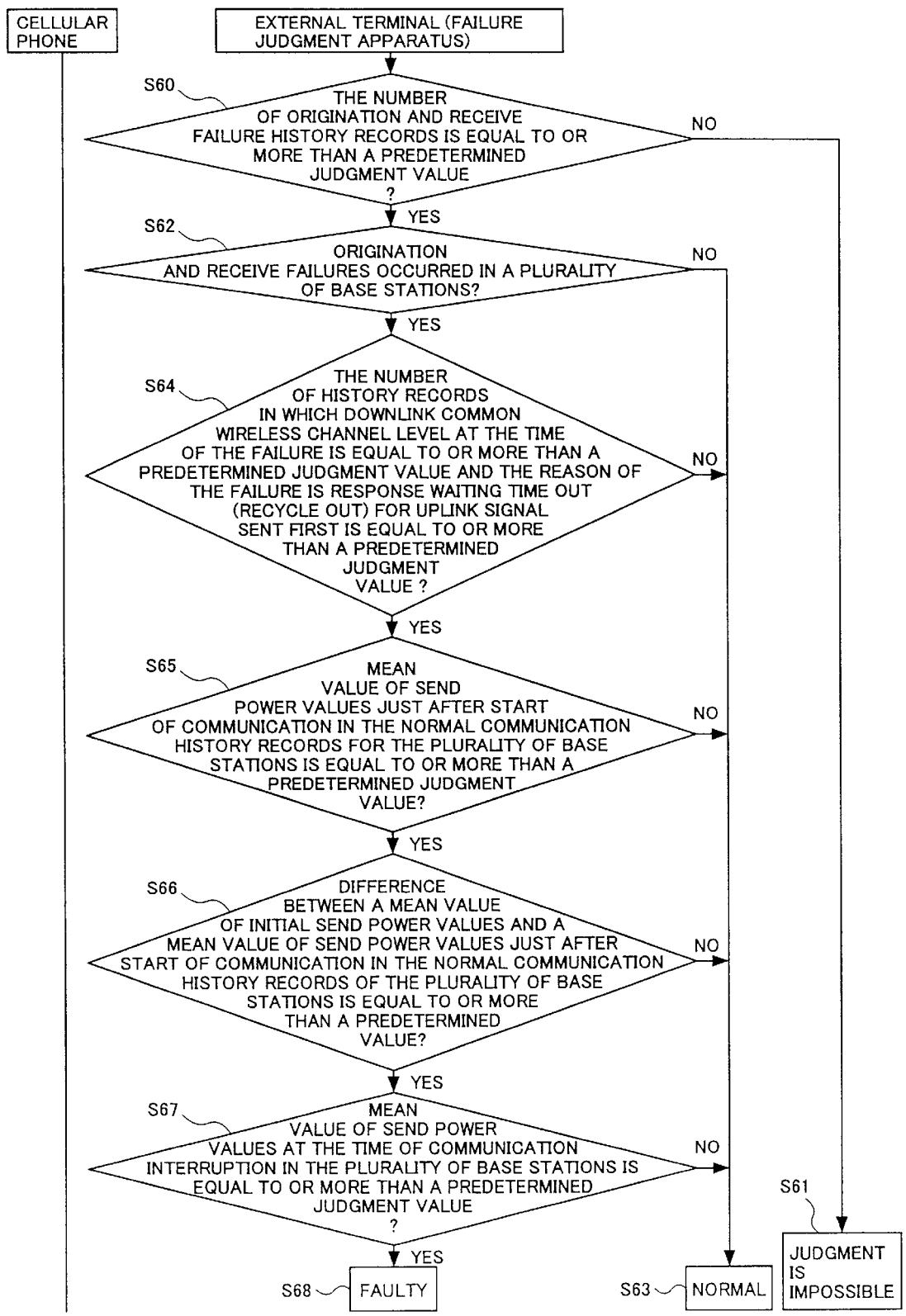
FIG. 9 is a flowchart showing a send power failure judgment example in the external terminal.

FIG. 9 is a flowchart showing a send power failure judgment example in the external terminal.

First, the external terminal checks whether the number of origination and receive failure history records is equal to or more than a predetermined judgment value in step 60. When the number is smaller than the predetermined judgment value (N in step 60), the send power failure judgment ends in step 61 since the judgment is impossible.

When the number of origination and receive failure history records is equal to or more than the predetermined judgment value (Y in step 60), it is judged whether origination and receive failures occurred in a plurality of base stations based on notification information (base station identification code) of the origination and receive failure history records in step 62. When all of the origination and receive failures occurred between the cellular phone and one base station (N in step 62), it is judged that the cellular phone 10 is normal in step 63 since it can not be judged whether the cause of the failure is in the cellular phone 10 or in the base station.

On the other hand, when the failures occurred in a plurality of base stations (Y in step 62), it is judged that the number of history records in which downlink common wireless channel level at the time of the failure is equal to or more than a predetermined judgment value and the reason of the failure is response waiting time out (recycle out) for uplink signal sent first is equal to or more than a predetermined judgment value in step 64. When the number is not equal to or more than the predetermined judgment value (N in step 64), it is judged that the cellular phone 10 is normal in step 63 since it can not be judged that the cause of the failure is in the cellular phone 10.

When the number is equal to or more than the judgment value (Y in step 64), it is judged whether a mean value of send power values just after start of communication in the normal communication history records for the plurality of base stations is equal to or more than a predetermined judgment value in step 65. When the mean value is not equal to or more than the predetermined judgment value (N in step 65), it is judged that the cellular phone 10 is normal in step 63 since it can not be judged that the cause of the failure is in the cellular phone 10.

When the mean value of send power values just after start of communication in the normal communication history records is equal to or more than the predetermined judgment value (Y in step 65), it is judged whether difference between a means value of initial send power values and a mean value of send power values just after start of communication in the normal communication history records of the plurality of base stations is equal to or more than a predetermined value in step 66.

When the difference is smaller than the predetermined judgment value (N in step 66), it is judged that the cellular phone 10 is normal in step 63 since it can not be judged that the cause of the communication interruption is in the cellular phone 10.

When the difference is equal to or more than the predetermined judgment value (Y in step 66), it is judged whether a mean value of send power values at the time of communication interruption in the plurality of base stations is equal to or more than a predetermined judgment value in step 67. When the mean value is not equal to or more than the predetermined judgment value (N in step 67), it is judged that the cellular phone 10 is normal in step 63 since it can not be judged that the cause of the communication interruption is in the cellular phone 10. When the mean value is equal to or more than the predetermined judgment value (Y in step 67), it is judged that the cellular phone 10 is faulty due to send power failure in step 68.

In the above-mentioned processes, it can be judged, in step 64, whether send power is small since the response waiting time out for uplink signal at the time of call origination occurs when the send power is small.

In step 65, it is judged whether the send power value in which power control has been performed (the send power value just after start of communication) is equal to or more than the predetermined judgment value. Then, when the send power value is smaller than the predetermined judgment value, it is judged that send power is normally controlled with respect to receive level. On the other hand, when the send power value is equal to or more than the predetermined judgment value, it is judged that there is a possibility that send power system is faulty. In step 66, failure is judged by checking the difference between the initial send power value and the controlled send power value.

If send power control is performed normally, send power at the time of communication interruption should be low. Thus, it is judged that the cellular phone is faulty when send power is high in step 67. When the mean value of the send power is not equal to or more than the judgment value, it can be judged that the send power control is properly performed. Thus, it is judged that the send power system is normal.

In the above-mentioned embodiment, as shown in FIG. 6, each judgement is performed successively after the judgment parameters are read (step 33). Instead of this procedure, another procedure can be performed. For example, it is determined which judgment is performed according to the number of history records of each communication history information, then, the judgment according to the number is performed.

Figure 10:
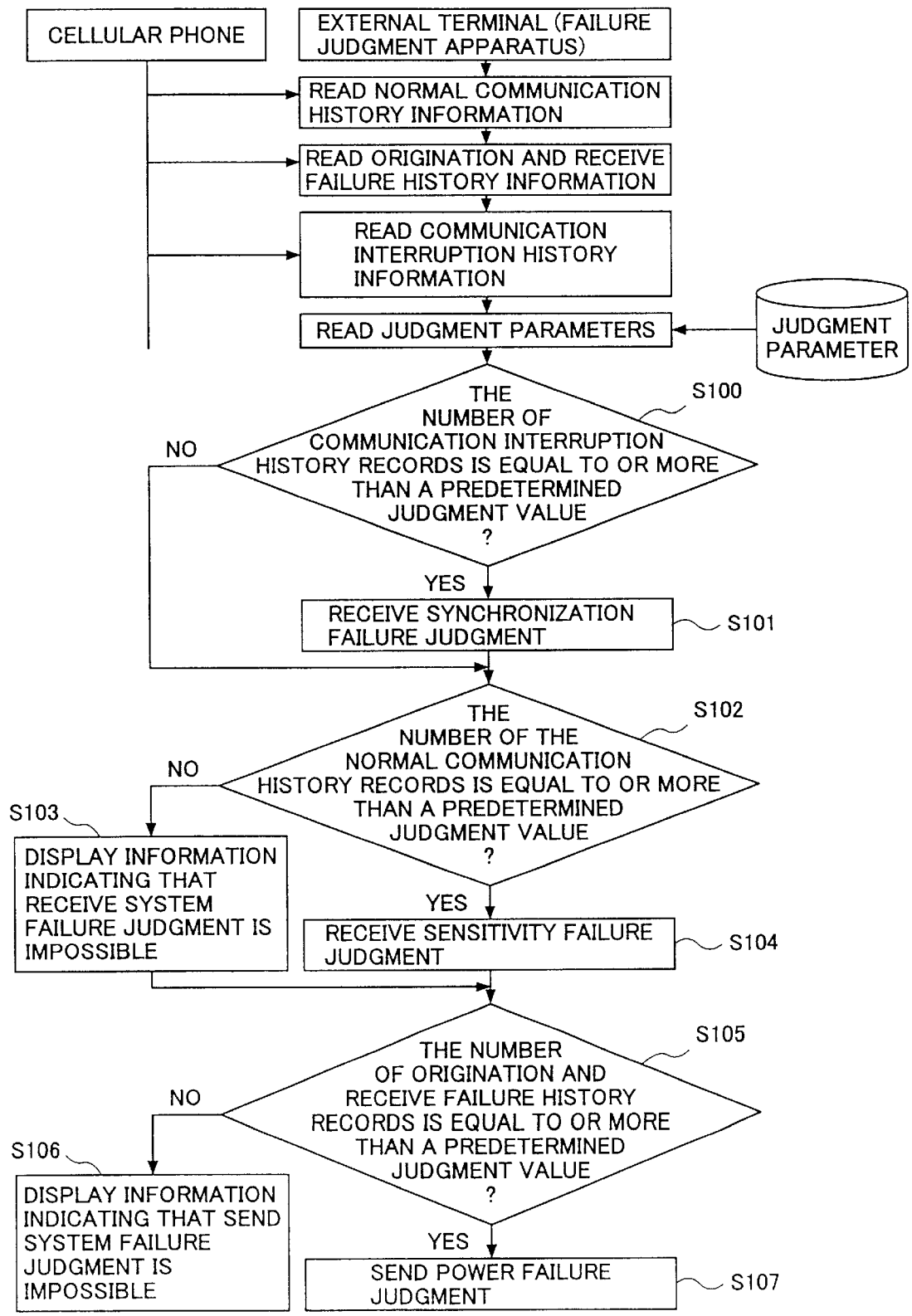
FIG. 10 is a flowchart example in a case when judgment process is performed according to the number of history records of each communication history information.

In this case, judgment process can be performed according to a flowchart shown in FIG. 10 for example.

After the judgment parameters are read, when the number of communication interruption history records is not equal to or more than a predetermined judgment value (N in step 100), the receive synchronization judgment is not performed. When the number of communication interruption history records is equal to or more than a predetermined judgment value (Y in step 100), the receive synchronization judgment is performed in step 101. Next, when the number of the normal communication history records is not equal to or more than a predetermined judgment value (N in step 102), the external terminal displays information indicating that receive system failure judgment is impossible in step 103 and the receive sensitivity failure judgment is not performed. When the number of the normal communication history records is equal to or more than the predetermined judgment value (Y in step 102), the receive sensitivity failure judgment is performed in step 104. Then, when the number of origination and receive failure history records is not equal to or more than a predetermined judgment value (N in step 105), the external terminal displays information indicating that send system failure judgment is impossible in step 106. When the number of origination and receive failure history records is equal to or more than the predetermined judgment value (Y in step 105), the send power judgment is performed in step 107.

According to the present invention, when the cellular phone detects an event in which communication is not performed normally, the cellular phone stores, in a memory of the cellular phone, the reason why the event occurred and items specific to mobile communication indicating statuses in which the cellular phone reached the event as communication history information.

Then, the communication history information is output to the external terminal according to a reading out command from the external terminal connected to the cellular phone. The external terminal performs failure judgment for the cellular phone 10 by using the communication history information and judgment parameters stored in the external terminal.

The failure judgment process of the present invention can be executed by a program installed in the external terminal. The program can be installed from a recording medium such as a CD-ROM. In addition, the program can be downloaded via a network and can be installed.

As mentioned above, according to the present invention, the cellular phone stores communication history information and the external terminal which has judgment parameters reads the communication history information. Thus, failure judgment based on failure report by a user can be performed immediately without considering ability of replication of the failure and time necessary for the replication when replicating the failure and using the wireless part measuring apparatus.

The present invention is not limited to the specifically disclosed embodiments, and variations and modifications may be made without departing from the scope of the invention.

What is claimed is:

1. A cellular phone comprising:
 a memory part which stores, as communication history information, notification information sent from a base station and information indicating radio status when communication is performed normally without a failure, a reason why communication is not performed normally when communication is not performed normally and at least one failure arises, and notification information sent from a base station and information indicating radio status when communication is not performed normally; and
 an interface part which outputs said communication history information to an external terminal connected to said interface part,
 wherein said reason why communication is not performed normally is determined by said cellular phone;
 wherein said notification information sent from said base station includes a base station identification code;
 wherein said information indicating radio status includes a receive level of downlink wireless channel of said cellular phone in a standby status, a send power value in which send power control is performed when communication is not performed normally, a receive level of downlink wireless channel when communication is not performed normally, and quality of downlink wireless channel when communication is not performed normally; and wherein said notification information is used by said external terminal to determine whether said cellular phone is faulty, and to determine a failure type of said cellular phone from among a receive synchronization failure judgment, a receive sensitivity failure judgment, and a send power failure judgment if said cellular phone is faulty.

2. The cellular phone as claimed in claim 1, wherein said memory part further stores communication date and time, and operation status of said cellular phone as said communication history information.

3. The cellular phone as claimed in claim 2, wherein said communication date and time includes date and time of storing said communication history information;

said operation status includes information indicating one of operations of position registration, call origination, call receiving or communication state which the cellular phone did not perform normally.

4. A cellular phone comprising:

a memory part which stores normal communication history information when communication is performed normally without a failure, origination and receive failure history information when origination and receive are not performed normally and at least one failure arises, and communication interruption history information when communication is interrupted; and an interface part which outputs each history information stored in said memory part to an external terminal connected to said interface part, wherein each of said history information includes notification information sent from a base station, and information indicating radio status, said notification information sent from said base station including a base station identification code;

wherein said information indicating radio status includes a receive level of downlink wireless channel of said cellular phone in a standby status, a send power value in which send power control is performed when communication is not performed normally, a receive level of downlink wireless channel when communication is not performed normally, and quality of downlink wireless channel when communication is not performed normally; and wherein said notification information is used by said external terminal to determine whether said cellular phone is faulty, and to determine a failure type of said cellular phone from among a receive synchronization failure judgment, a receive sensitivity failure judgment, and a send power failure judgment if said cellular phone is faulty.

5. The cellular phone as claimed in claim 4, wherein each of said history information includes a base station identification code; and each of said origination and receive failure history information and said communication interruption history information includes communication failure reasons.

6. The cellular phone as claimed in claim 5, wherein resynchronization waiting time out in an event of loss of synchronism is one of said failure reason in said communication interruption history information.

7. The cellular phone as claimed in claim 5, wherein response waiting time out for call origination request signal is one of said failure reason in said origination and receive failure history information.

8. A method of cellular phone failure judgment comprising:

connecting a cellular phone to an external terminal, said cellular phone comprising a memory part which stores, as communication history information, notification information sent from a base station and information indicating radio status when communication is performed normally without a failure, a reason why communication is not performed normally when communication is not performed normally and at least one failure arises, and notification information sent from a base station and information indicating radio status when communication is not performed normally; and an interface part which outputs said communication history information to said external terminal;

said external terminal reading said communication history information stored in said memory part of said cellular phone, and performing failure judgment for said cellular phone;

wherein said reason why communication is not performed normally is determined by said cellular phone;

wherein said notification information sent from said base station includes a base station identification code;

wherein said information indicating radio status includes a receive level of downlink wireless channel of said cellular phone in a standby status, a send power value in which send power control is performed when communication is not performed normally, a receive level of downlink wireless channel when communication is not performed normally, and quality of downlink wireless channel when communication is not performed normally; and wherein said notification information is used by said external terminal to determine whether said cellular phone is faulty, and to determine a failure type of said cellular phone from among a receive synchronization failure judgment, a receive sensitivity failure judgment, and a send power failure judgment if said cellular phone is faulty.

9. The method as claimed in claim 8, further comprising:

said external terminal comparing judgment parameters stored in said external terminal and said communication history information stored in said memory part of said cellular phone, and performing failure judgment.

10. The method as claimed in claim 8, further comprising:

judging whether situations in which communication was not performed normally occurred in a plurality of base stations or in only one base station;

judging that said cellular phone is faulty only when it is judged that said situations occurred in a plurality of base stations.

11. A method of cellular phone failure judgment comprising:

a cellular phone storing normal communication history information when communication is performed normally without a failure, origination and receive failure history information when origination and receive are not performed normally and at least one failure arises, and communication interruption history information when communication is interrupted;

a failure judgment apparatus reading said normal communication history information, said origination and receive failure history information and said communication interruption history information;

wherein each of said history information includes notification information sent from a base station, and information indicating radio status, said notification information sent from said base station including a base station identification code;

wherein said information indicating radio status includes a receive level of downlink wireless channel of said cellular phone in a standby status, a send power value in which send power control is performed when communication is not performed normally, a receive level of downlink wireless channel when communication is not performed normally; and quality of downlink wireless channel when communication is not performed normally; and wherein said notification information is used by said external terminal to determine whether said cellular phone is faulty, and to determine a failure type of said cellular phone from among a receive synchronization failure judgment, a receive sensitivity failure judgment, and a send power failure judgment if said cellular phone is faulty.

12. The method as claimed in claim 11, further comprising:

said failure judgment apparatus determining which failure judgment is performed among said receive synchronization, receive sensitivity and send power according to the number of records of each of said history information.

13. The method as claimed in claim 11, further comprising:

said failure judgment apparatus comparing judgment parameters stored in said failure judgment apparatus and predetermined information in said history information, and performing failure judgment.

14. The method as claimed in claim 11, further comprising:

judging whether situations in which communication was not performed normally occurred in a plurality of base stations or in only one base station;

judging that said cellular phone is faulty only when it is judged that said situations occurred in a plurality of base stations.

15. The method as claimed in claim 13, wherein said communication interruption history information includes reasons for communication interruption, said method further comprising:

judging that said cellular phone has a failure of receive synchronization when a mean value of receive levels of downlink wireless channels in communication interruption history records having synchronization failure as said reason is equal to or more than a predetermined judgment parameter value and when a mean value of qualities of downlink wireless channels in said communication interruption history records is equal to or more than a predetermined judgment parameter value.

16. The method as claimed in claim 13, further comprising:

judging that said cellular phone has a failure on receive sensitivity when, in said communication interruption history information, a mean value of send power values at the time of communication interruption is equal to or less than a predetermined judgment parameter value when a mean value of receive levels of downlink wireless channels at the time of communication interruption is equal to or less than a predetermined judgment parameter value and when, in said normal communication history information, a mean value of receive levels of downlink wireless channels in a standby status is equal to or less than a predetermined judgment parameter value.

17. The method as claimed in claim 13, wherein said origination and receive failure history information includes reasons for origination and receive failure; said method further comprising:

judging that said cellular phone has a failure on send power when the number of records in said origination and receive failure history information is equal to or more than a predetermined judgment parameter value in each of which records receive level of downlink wireless channel in a standby status is equal to or more than a predetermined judgment parameter value and said reason is response waiting time out for call origination request signal, and when a mean value of send power values in base stations, in which origination and receive failure occurred, is equal to or more than a predetermined judgment parameter value at the time of normal communication.

18. A failure judgment apparatus comprising:

a part which connects to a cellular phone storing normal communication history information when communication is performed normally without a failure judgments are made, origination and receive failure history information when origination and receive are not performed normally and at least one failure arises, and communication interruption history information when communication is interrupted;

a part which reads said normal communication history information, said origination and receive failure history information and said communication interruption history information;

a part which performs failure judgment, wherein each of said history information includes notification information sent from a base station, and information indicating radio status, said notification information sent from said base station including a base station identification code;

wherein said information indicating radio status includes a receive level of downlink wireless channel of said cellular phone in a standby status, a send power value in which send power control is performed when communication is not performed normally, a receive level of downlink wireless channel when communication is not performed normally, and quality of downlink wireless channel when communication is not performed normally; and wherein said notification information is used by said external terminal to determine whether said cellular phone is faulty, and to determine a failure type of said cellular phone from among a receive synchronization failure judgment, a receive sensitivity failure judgment, and a send power failure judgment if said cellular phone is faulty.

19. The failure judgment apparatus as claimed in claim 18, further comprising:

a part which determines which failure judgment is performed among said receive synchronization, receive sensitivity and send power according to the number of records of each of said history information.

20. The failure judgment apparatus as claimed in claim 18, further comprising:
a part which stores judgment parameters; and
a part which compares said judgment parameters and predetermined information in said history information, and performing failure judgment.

21. The failure judgment apparatus as claimed in claim 18, further comprising:
a part which judges whether situations in which communication was not performed normally occurred in a plurality of base stations or in only one base station;
a part which judges that said cellular phone is faulty only when it is judged that said situations occurred in a plurality of base stations.

22. The failure judgment apparatus as claimed in claim 20, wherein said communication interruption history information includes reasons for communication interruption, said failure judgment apparatus further comprising:
a part which judges that said cellular phone has a failure of receive synchronization
when a mean value of receive levels of downlink wireless channels in communication interruption history records having synchronization failure as said reason is equal to or more than a predetermined judgment parameter value and
when a mean value of qualities of downlink wireless channels in said communication interruption history records is equal to or more than a predetermined judgment parameter value.

23. The failure judgment apparatus as claimed in claim 20, further comprising:
a part which judges that said cellular phone has a failure on receive sensitivity
when, in said communication interruption history information, a mean value of send power values at the time of communication interruption is equal to or less than a predetermined judgment parameter value when a mean value of receive levels of downlink wireless channels at the time of communication interruption is equal to or less than a predetermined judgment parameter value and
when, in said normal communication history information, a mean value of receive levels of downlink wireless channels in a standby status is equal to or less than a predetermined judgment parameter value.

24. The failure judgment apparatus as claimed in claim 20, wherein said origination and receive failure history information includes reasons for origination and receive failure, said failure judgment apparatus further comprising:
a part which judges that said cellular phone has a failure on send power
when the number of records in said origination and receive failure history information is equal to or more than a predetermined judgment parameter value in each of which records receive level of downlink wireless channel in a standby status is equal to or more than a predetermined judgment parameter value and said reason is response waiting time out for call origination request signal, and
when a mean value of send power values in base stations, in which origination and receive failure occurred, is equal to or more than a predetermined judgment parameter value at the time of normal communication.

25. A computer readable medium storing program code for causing a computer to perform failure judgment for a cellular phone, wherein said computer connects to said cellular phone which stores normal communication history information when communication is performed normally without a failure, origination and receive failure history information when origination and receive are not performed normally and at least one failure arises, and communication interruption history information when communication is interrupted, said computer readable medium comprising:
first program code means for reading said normal communication history information, said origination and receive failure history information and said communication interruption history information;
second program code means for performing failure judgment,
wherein each of said history information includes notification information sent from a base station, and information indicating radio status, said notification information sent from said base station including a base station identification code;
wherein said information indicating radio status includes a receive level of downlink wireless channel of said cellular phone in a standby status, a send power value in which send power control is performed when communication is not performed normally, a receive level of downlink wireless channel when communication is not performed normally, and quality of downlink wireless channel when communication is not performed normally; and
wherein said notification information is used by said external terminal to determine whether said cellular phone is faulty, and to determine a failure type of said cellular phone from among, a receive synchronization failure judgment, a receive sensitivity failure judgment, and a send power failure judgment if said cellular phone is faulty.

26. The computer readable medium as claimed in-claim 25, further comprising:
third program code means for determining which failure judgment is performed among said receive synchronization, receive sensitivity and send power according to the number of records of each of said history information.

27. The computer readable medium as claimed in claim 25, further comprising:
third program code means for comparing judgment parameters stored in said computer and predetermined information in said history information, and performing failure judgment.

28. The computer readable medium as claimed in claim 25, further comprising:
third program code means for judging whether situations in which communication was not performed normally occurred in a plurality of base stations or in only one base station; and
fourth program code means for judging that said cellular phone is faulty only when it is judged that said situations occurred in a plurality of base stations.

29. The computer readable medium as claimed in claim 27, wherein said communication interruption history information includes reasons for communication interruption, said computer readable medium further comprising:
fourth program code means for judging that said cellular phone has a failure of receive synchronization when a mean value of receive levels of downlink wireless channels in communication interruption history records having synchronization failure as said reason is equal to or more than a predetermined judgment parameter value and when a mean value of qualities of downlink wireless channels in said communication interruption history records is equal to or more than a predetermined judgment parameter value.

30. The computer readable medium as claimed in claim 27, further comprising:

fourth program code means for judging that said cellular phone has a failure on receive sensitivity when, in said communication interruption history information, a mean value of send power values at the time of communication interruption is equal to or less than a predetermined judgment parameter value when a mean value of receive levels of downlink wireless channels at the time of communication interruption is equal to or less than a predetermined judgment parameter value and when, in said normal communication history information, a mean value of receive levels of downlink wireless channels in a standby status is equal to or less than a predetermined judgment parameter value.

31. The computer readable medium as claimed in claim 27, wherein said origination and receive failure history information includes reasons for origination and receive failure, said computer readable medium further comprising:

fourth program code means for judging that said cellular phone has a failure on send power when the number of records in said origination and receive failure history information is equal to or more than a predetermined judgment parameter value in each of which records receive level of downlink wireless channel in a standby status is equal to or more than a predetermined judgment parameter value and said reason is response waiting time out for call origination request signal, and when a mean value of send power values in base stations, in which origination and receive failure occurred, is equal to or more than a predetermined judgment parameter value at the time of normal communication.

* * * * *